Figure 1:
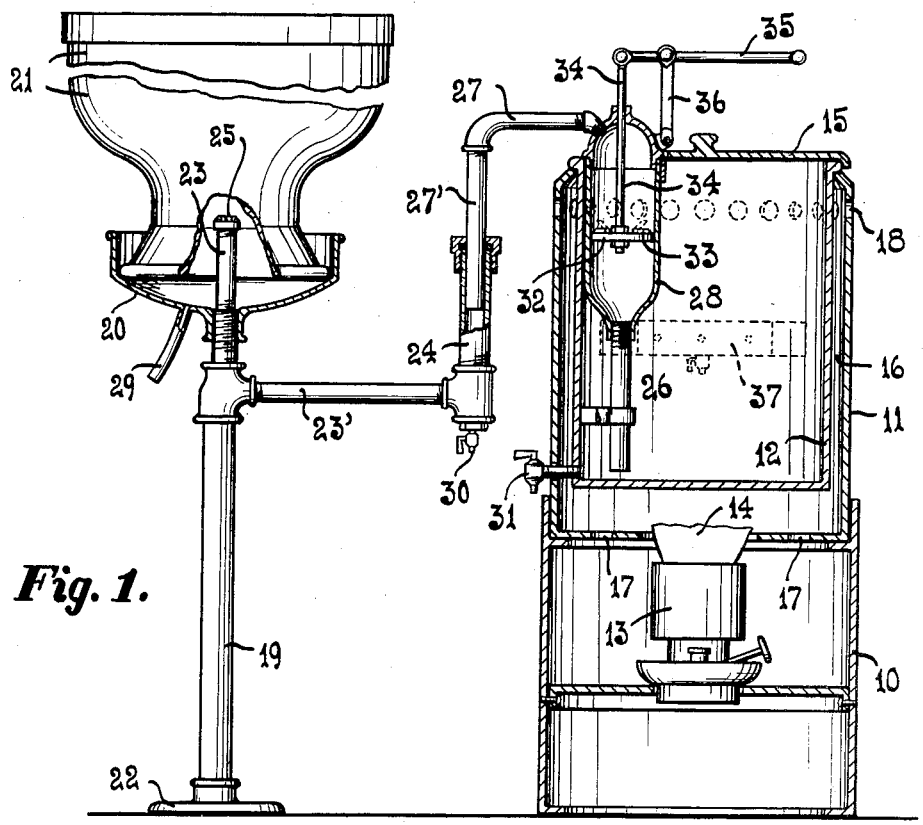

April 24, 1934.  A. N. EATON  1,956,063

CAN WASHING APPARATUS

Filed March 28, 1933

Inventor
A. N. Eaton
By *Arthur H. Sturges*
Attorney

Patented Apr. 24, 1934

1,956,063

UNITED STATES PATENT OFFICE 1,956,063

CAN WASHING APPARATUS

Albert N. Eaton, Omaha, Nebr.

Application March 28, 1933, Serial No. 663,166

2 Claims. (Cl. 141—7)

This invention relates to a can washing apparatus or machine useful generally for cleaning large receptacles, and designed specifically for cleaning and cleansing milk cans.

The principal object of the invention is to provide a portable washer for use by dairy farmers or others engaged in the production and sale of milk and cream transported and delivered in cans, the proportion of parts as to size and weight being such that the washer may be conveniently moved from one place to another as may be required, the parts being few and simple and of such arrangement that manufacture will be practical and economical.

The invention includes a two-part structure, the spraying, cleaning and cleansing part being movably connected with the water heating part of the washer.

The invention also includes such a construction that the washing and cleansing parts of the apparatus may be swung to the right or left side of the water heating and pumping parts so that the work may be performed by a single operator, and includes a coupling which permits the swingable parts to be elevated or lowered relative to the water heating parts, depending upon the ground surfaces upon which the apparatus may be supported.

With the foregoing and other objects in view the invention presents a new and useful construction, combination and arrangement of parts as described herein and claimed, and as illustrated in the drawing, it being understood that changes may be made in form, size, proportion of parts and minor details, said changes being within the scope of the invention as claimed.

In the drawing, Figure 1 is a view in side elevation, partly in section, of a can washing machine embodying the present invention, parts being in section, a can in an inverted position for cleaning and cleansing being shown broken away and partly in section.

Figure 2:
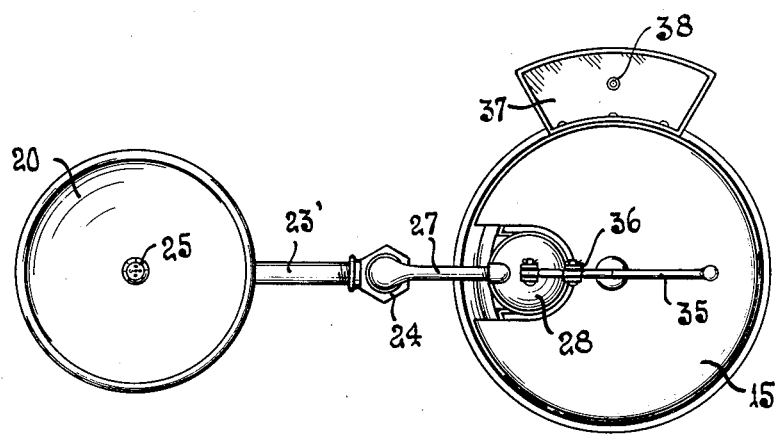

Figure 2 is a plan view of parts shown in Figure 1, the can being omitted.

Referring now to the drawing for a more particular description wherein like characters indicate like parts, the numeral 10 indicates the base of an oven or heating chamber 11 in which is placed a boiler or liquid supply member 12 heated by an oil burner 13 or the like producing a flame 14.

Numeral 15 indicates a lid for the boiler, and water in the boiler will become heated by movement of hot air upwardly in the annular space 16 between members 11 and 12 and by the flame 14 applied to the bottom of the boiler, suitable apertures being provided as an aid to draft and combustion, as indicated at 17 and 18.

Numeral 19 indicates a standard provided at its top with a bowl 20 adapted to support the neck of a receptacle or can therein as indicated at 21, said standard being provided with a base 22 for a support on the ground.

In Figure 1 of the drawing the can 21 appears partly in section to show the terminal upright part 23 of a discharge pipe, said discharge pipe being carried by the standard and having a terminal part 23' projecting laterally from the standard.

As thus described, the parts 23 and 23' provide a discharge pipe of "elbow shape", the upright part 23 traversing the bowl centrally thereof. Numeral 24 indicates an upwardly projecting sleeve which is mounted upon the outwardly projecting part 23' of the discharge-pipe.

Any suitable means may be employed for moving water from the boiler to be discharged through the nozzle or spraying element 25 of the discharge pipe for cleaning and cleansing receptacles when placed upon the bowl 20, and in the present instance a pump 26 is shown, a conducting pipe 27 being used in communication with the cylinder 28 of the pump, said conducting pipe 27 having a downwardly projecting part 27' engaging in the sleeve 24.

The downwardly projecting part 27' of the conducting pipe is slidably mounted in the sleeve 24 and therefore these parts may have rotatable movements relative to each other.

While the device is in use, the standard 19 is generally disposed closely adjacent to the side of the boiler, and the standard may be swung to either side of the boiler, the pipe 27' operating as a pivot or vertical axis for the movements mentioned for the standard and parts carried thereby.

It will be understood that the machine is generally used in the field or unsheltered places by dairy farmers, except in the winter season and the slidable movements mentioned permit vertical adjustments of the standard to be made in places where the ground is rough or uneven. Also since the sleeve and conducting pipe may be disconnected from each other this feature is of advantage when making shipments of the machines from the factory.

Numeral 29 indicates a drain pipe for the bowl 20 and at 30 and 31 are indicated drain-cocks, respectively, for the sleeve and boiler. The piston for the pump and check valve therefor are indicated, respectively, at 32 and 33. The piston-rod is indicated at 34, and the pump handle and its fulcrum are indicated, respectively, at 35 and 36. Numeral 37 indicates a shelf which is secured to the side of the cylindrical part 11 of the furnace for containing certain tools used in the operation of the machine, said shelf having the form of a receptacle and provided with a drainage member 38.

In the use of the machine a single operator, if desired, may pump water for cleansing and also attend to handling the cans, and for this reason it is important that the standard, with its bowl, may have the swinging movements to a selected side of the boiler as above described.

While the drawing shows a sleeve 24 which receives the terminal part of the conducting pipe 27' so that the standard may be adjusted vertically and may have swinging movements relative to the boiler, it is obvious that these parts could be modified or changed, the important feature being that the coupling or connection of the parts shall be such that the standard may have the adjustments mentioned, and I do not wish to limit myself to exactness in this respect.

Having described the parts of the machine and their uses, operation will be readily understood. The use of the burner 13 provides a heat which may be practically uninterrupted so that the hot water supply will be available when required. Since the cans must be sterilized before being filled with milk and cream, the labor and expense of this work is considerable when performed manually, but by use of the device, farmers and dairymen have found the machine to be of great advantage.

I claim as my invention:—

1. A can washing apparatus comprising a heater, a boiler mounted in the upper end of the heater, a hand pump mounted in the boiler and projecting through the upper end thereof for operation at the top of the boiler, a supply pipe section leading from the pump and downturned at the side of the heater, a stand, a can receiving basin mounted on the upper end of the stand, a second supply pipe section carried by the stand and leading from the basin and extending laterally from the stand and basin and provided on its outer end with an upturned slip joint coupling engaging said downturned portion of the supply pipe section of the pump whereby said pump may be operated by one hand at the top of the heater and a can may be supported on the basin by the other hand, and said stand and said heater may be relatively adjusted for easy access by an operator and to different ground elevations supporting the apparatus.

2. A can washing apparatus comprising a heater, a boiler suspended in the upper end of the heater, a pump mounted in the boiler for withdrawing heated water therefrom and disposed at the top of the boiler and having a handle thereabove for easy access to operate the pump, a supply pipe section carried by the pump and turned downwardly at one side of the heater, a separately movable stand, a basin mounted on the upper end of the stand, a second supply pipe section connected to the basin and extending laterally of the stand and having at its outer end an upwardly extending slip coupling for slidable and rotatable engagement with the lower end of said first supply pipe section, whereby said stand may be swung about its connection toward the side of the heater within easy access of the operator manipulating the pump.

ALBERT N. EATON.